United States Patent Office 3,806,320
Patented Apr. 23, 1974

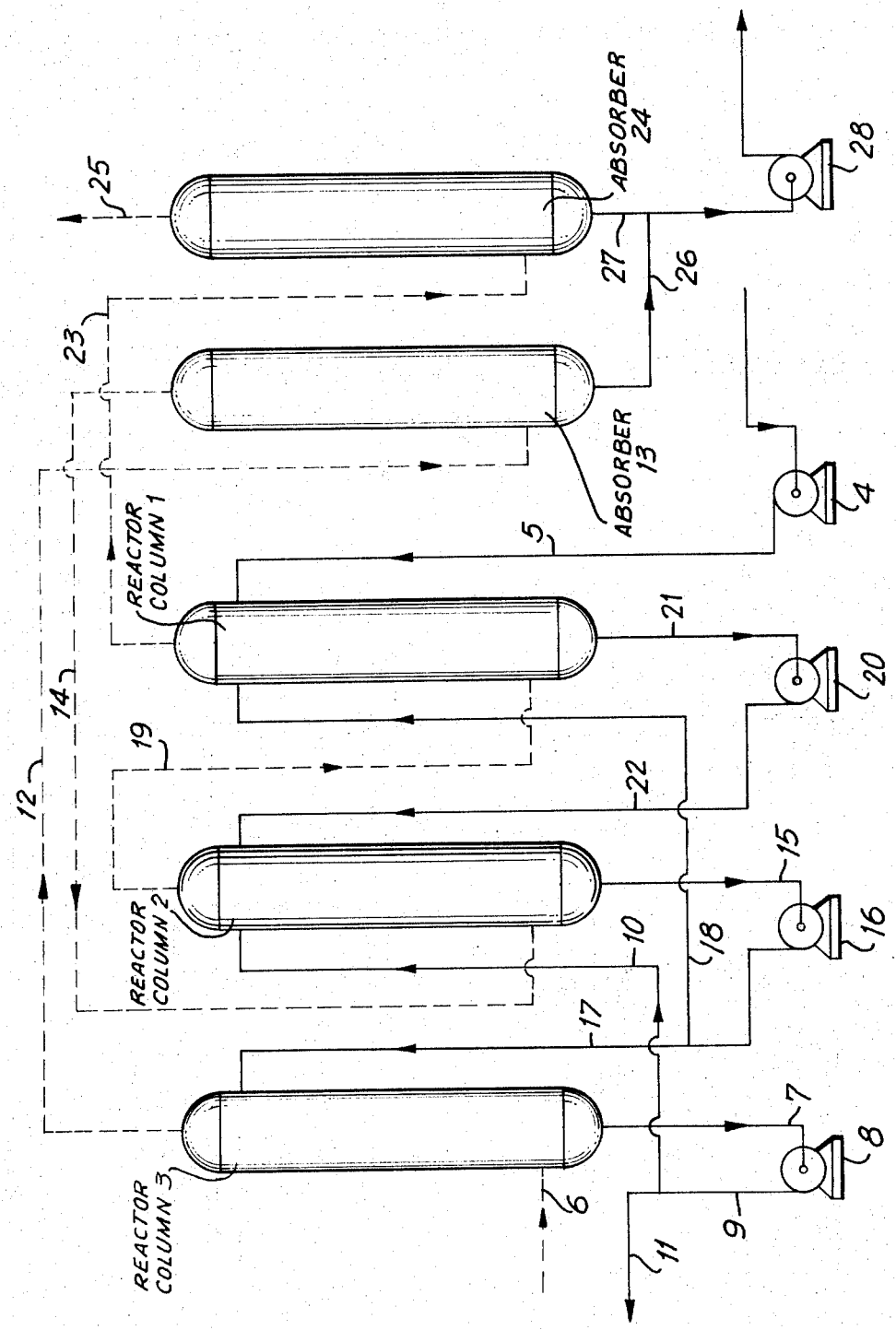

3,806,320
APPARATUS FOR CONTINUOUS PRODUCTION OF STABLE CHLOROPARAFFINS
Lutz Erlenbach, Salzbergen, Cuno Conrad, Hamburg, and Rudolf Hermann, Salzbergen, Germany, assignors to Wintershall Aktiengesellschaft, Kassel, Germany
Filed May 17, 1971, Ser. No. 144,095
Int. Cl. C07c 17/02; B01j 1/00
U.S. Cl. 23—260
8 Claims

ABSTRACT OF THE DISCLOSURE

An apparatus for continuously producing stable chloroparaffins by reacting, in a plurality of successive chlorination stages, highly-refined, petroleum-based paraffin hydrocarbon mixtures with chlorine under controlled thermal conditions. A portion of the reaction product containing chloroparaffin is recycled to a previous reaction stage in order to enhance the process of chlorination of the paraffin hydrocarbon mixtures in that stage.

The apparatus further passes the residual reaction gas emanating from at least the final stage, and containing chlorine and hydrogen chloride, into a hydrogen chloride absorber which produces a gaseous product constituted essentially of chlorine. This gaseous chlorine is then recycled to a preceding reactor chlorination stage in order to enhance the chlorination process therein.

BACKGROUND OF INVENTION

Field of the invention

This invention relates to a process for the production of stable chloroparaffins and, more particularly, to the continuous production of stable chloroparaffins through the chlorination of highly-refined, petroleum based paraffin hydrocarbons.

When producing stable chloroparaffins through a system or apparatus of continuously reacting highly-refined mixtures of paraffin hydrocarbons with generally gaseous chlorine, an important consideration is the obtention of the highest possible yield of chloroparaffin with respect to the time required for converting the paraffin hydrocarbons, and concerning the equipment needed, so as to attain a complete conversion into chloroparaffin while maintaining the reaction space at minium volume. In essence, small reaction chambers or spaces for this type of chlorination process are only advantageous if it is not necessary to empty them after each conversion reaction between gaseous chlorine and paraffin hydrocarbon mixtures, as is the usual procedure when producing chloroparaffins in an intermittent or batch sequence. Consequently, the continuous production of chloroparaffins obtained by reacting gaseous chlorine and highly-refined mixtures of paraffin hydrocarbons is particularly desirable and advantageous if it results in providing essentially large yields of chloroparaffins per unit time within relatively small reaction spaces or chambers.

Description of prior art

Continuous chlorination processes and systems which provide for the chlorination reaction between highly-refined paraffin hydrocarbons and gaseous chlorine so as to form chloroparaffins are generally widely known, and are described, for example, in German published application Nos. 1,180,726, 1,193,024 and 1,197,069. However, none of these prior art chlorination processes for producing chloroparaffins are completely suitable for providing the desired quantities of chloroparaffin in sufficiently large volume per unit time, and in relatively small reaction spaces or chambers in order to render the processes satisfactory from an economic standpoint.

Thus, in the process disclosed in German published application 1,180,726, practically chlorine-free hydrogen chloride is withdrawn from each chlorination stage in a plurality of reaction stages. Since the chlorine in each chlorination or reaction stage must be completely converted, this requires a fairly extensive dwell or conversion time period for each stage in order to achieve the complete chlorination of the paraffin hydrocarbons, and furthermore requires relatively large reaction spaces or chambers. Consequently, this process provides a relatively small yield of chloroparaffins in proportion to the requirements of space and production time. Additionally, the time delay encountered, similarly affects the concurrent or parallel flow of the basic paraffin supply, as well as the chlorinated paraffin and chlorine, thereby rendering the continuous manufacture of chloroparaffins according to this known process quite cumbersome.

In the process of producing chloroparaffins according to German published application 1,193,024, the hydrocarbon converting or chlorination sequence is effected in a plurality of bent reactor tubes which extend into contiguous separating tanks adapted to provide for the separation of the gas/liquid chloroparaffin-containing mixture resulting from the chlorination of the paraffin hydrocarbons. In order to effectively carry out the continuous production process for stable chloroparaffin according to German published applicaiton 1,193,024, extremely complex and costly apparatus must be utilized. Furthermore, the successive conversion or chlorination stage,s utilizing the bent reactor tubes with contiguous separating tanks, encumbers each successive reaction stage with excessive or ballast hydrogen chloride residue gas, which cannot be readily utilized for chlorination of the paraffin hydrocarbons. In view of the foregoing, this particular process has only limited practical applications and would not be readily adaptable for economically viable continuous processes of forming stable chloroparaffins.

Finally, in the continuous process of forming stable chloroparaffins from paraffin hydrocarbon mixtures according to German published application 1,197,069, cooling water is injected into the reactor chambers in which the chlorination of the paraffin hydrocarbon takes place so as to provide for the direct cooling and temperature control of the chlorination reaction. A particular disadvantage of this type of process lies in that the injected water can be separated from the reaction material, consisting of the chlorine and paraffin hydrocarbon mixtures, only with great difficulty and at a considerable equipment cost, thereby rendering the process highly uneconomical and unpractical.

SUMMARY OF THE INVENTION

In order to ameliorate or obviate the disadvantages and drawbacks encountered in prior art processes for the continuous production of stable chloroparaffins, the present invention contemplates an improved and novel system or apparatus for the continuous manufacture of stable chloroparaffins having chlorine contents of approximately 35% to 65% by weight, and wherein the chloroparaffins are formed by reacting, in a plurality of successive reaction stages, highly purified mixtures of petroleum-based paraffin hydrocarbons, having melting points between approximately 40° to 50° C. and average molecular weights between approximately 250 to 400, with chlorine in a counterflow relationship. Furthermore, the reaction or chlorination temperature in each of the reaction or reactor stages is closely regulated and maintained within the range of approximately 80° to 120° C. through the automatic control of the indirect cooling of at least the last reactor stage with respect to the chlorine gas supplied thereto, and in which a predetermined portion of the chloroparaffin reaction product at any given time is recycled to a preceding reactor stage with the remainder of the completely chlorinated chloroparaffin being withdrawn from the final reactor stage of the system as a finished end product.

An important aspect of the present invention lies in that the residual reaction gas produced in and emanating from the final reactor or conversion stage, containing approximately 20% to 50% chlorine by volume and 50% to 80% hydrogen chloride by volume, is conducted to an adiabatic hydrogen chloride absorber which converts at least a portion of the residual reaction gas to a gas containing over 95% chlorine by volume. The chlorine-containing gas issuing from the absorber is then conveyed into the preceding reactor stages so as to merge with the chlorine in the counterflow passing through the reactor stage, thereby as a concurrent result reducing the chlorine content in the residual reaction gas issuing from the primary or first chlorination reactor stage to a maximum chlorine content of 0.5% by volume in addition to the hydrogen chloride in the residual gas.

Another aspect of a preferred embodiment of the system for continuously producing stable chloroparaffins according to the present invention, consists in carrying out the chlorination conversion of the paraffin hydrocarbons in essentially three successive reactor or conversion stages, wherein a reaction product obtained in the final reactor stage is constituted essentially of completely chlorinated chloroparaffin,, of which at least 40% to 80% by weight is conveyed to the preceding reactor stage in order to enhance the chlorination process therein, with the remainder of the chloroparaffin being withdrawn from the processing system as the final end product. Similarly, a portion of the partially chlorinated chloroparaffin reaction product produced in the preceding or second reactor stage, is conveyed to the final reactor stage for further reaction, while the remainder is reconveyed to the first stage in order to enhance the chlorination reaction process in that stage.

In accordance with the present invention, the residual reaction gas emanating from the third or final stage contains approximately 40% chlorine by volume, the residual reaction gas issuing from the second stage contains approximately 10% to 15% chlorine by volume, and the residual reaction gas issuing from the first stage contains a maximum of approximately 0.5% chlorine by volume thereby indicating through an analysis of the chlorine content of each of the residual reaction gases that the process forms the final completely chlorinated chloroparaffin by reacting or chlorinating the paraffin hydrocarbon mixtures with chlorine at maximum efficiency.

Accordingly, it is an object of the present invention to provide for an improved apparatus for the continuous production of stable chloroparaffins.

Another object of the present invention is to provide a system for forming stable chloroparaffins having a chlorine content within the range of about 35% to 65% by weight through a continuous reaction process between chlorine and paraffin hydrocarbon mixtures.

Yet another object of the present invention is to provide for the continuous production of stable chloroparaffins having a chlorine content within the range of about 35% to 65% by weight through an apparatus providing a process of continuously reacting chlorine and highly-refined mixtures of petroleum-based paraffin hydrocarbons in a plurality of sequential chlorination reaction stages.

A further object of the present invention is to provide a system or apparatus for the continuous production of stable chloroparaffins through the continuous reaction between counterflowing gaseous chlorine and petroleum-based paraffin hydrocarbon mixtures in a plurality of sequential reactor stages including recycling at least a portion of the chloro-paraffin-containing reaction product obtained in each reactor stage to a preceding reactor stage to assist in enhancing the reaction sequence therein.

A still further object of the present invention is to provide a system for the continuous production of stable chloroparaffins in successive chlorination reactor stages by continuously reacting in counterflowing relationship gaseous chlorine and highly-refined mixtures of petroleum-based paraffin hydrocarbons, and in which the residual reaction gas produced in at least the final reactor stage is conveyed to an adiabatic hydrogen chloride absorber to form a chlorine-containing gas which is conducted to the preceding reactor stage in order to enhance the chlorination reaction process affected therein.

BRIEF DESCRIPTION OF THE DRAWING

In order to obtain a better understanding of the present invention, reference may now be had to the accompanying drawing wherein the single figure illustrates a schematic flow diagram showing an installation for the continuous production of stable chloroparaffins.

DETAILED DESCRIPTION

Referring now in detail to the drawing, a reactor system or installation for continuously producing stable chloroparaffins includes three bubbling reactors 1, 2 and 3, which may be of the vertical column or tower-type construction well known in the technology. The bubbling reactors 1, 2 and 3 each form, respectively, a first, a second and a third conversion or chlorination reactor stage for the production of the chloroparaffins.

A predetermined quantity of a highly-refined, petroleum-based paraffin carbon mixture is pumped from a supply source (not shown) by a pump 4 through a conduit 5 into the bubbling reactor 1, which forms the first chlorination reactor stage. Concurrently, a supply of chlorine, preferably in the gaseous state, is introduced in a continuous manner through an inlet conduit 6 into the bubbling reactor 3, which forms the last or final stage of the reactor system. The gaseous chlorine is adapted to flow through the reactor stages in a counterflowing relationship with the paraffin hydrocarbon mixtures.

During the chlorination reaction in bubbling reactor 3, the temperature of the chlorination reaction is regulated and maintained within the range of 80° to 100° C. by automatically controlling the cooling of the chlorine gas supplied to the final stage. The reaction between the chlorine and the paraffin hydrocarbon in the final reactor stage generates a residual reaction gas containing about 20% to 50% chlorine by volume and 50% to 80% hydrogen chloride by volume, and forms a reaction product comprising essentially completely chlorinated chloroparaffin containing 35% to 65% by weight of chlorine.

The chloroparaffin reaction product is withdrawn from reactor 3 through an outlet conduit 7 by means of an exhaust pump 8, which pumps the chloroparaffin product into an outlet conduit 9. A predetermined portion of the chloroparaffin product flowing through conduit 9 is conveyed through a branch conduit 10 into the preceding reactor stage, represented by bubbling reactor 2, so as to enhance the conversion of the paraffin hydrocarbons and partially chlorinated chloroparaffins conveyed thereto from bubbling reactor 1. The proportion of chloroparaffin which is conveyed into the second reactor stage from the final reactor stage through conduit 10 is generally within the range of 40% to 80% by weight of the total amount of completely chlorinated chloroparaffin end product produced in the final stage, while the remainder of the chloroparaffin is withdrawn from the system through an outlet conduit 11.

The residual reaction gas produced in and emanating from bubbling reactor 3 is conveyed through a conduit 12 into an adiabatic hydrogen chloride absorber 13. The hydrogen chloride absorber 13 is adapted to absorb the hydrogen chloride in the residual reaction gas so as to produce hydrochloric acid in an aqueous solution and a gas containing over 95% chlorine by volume. The gas obtained in the absorber 13 is then conveyed through a conduit 14 into the intermediate reactor stage formed by the bubbling reactor 2, wherein it is adapted to combine the chlorine in the counterflow so as to assist in accelerating the chlorination reaction of the paraffin hydrocarbons in that reactor stage.

The reaction product obtained in bubbling reactor 2, which includes partially chlorinated chloroparaffin, is conveyed through an outlet conduit 15, by means of an exhaust pump 16, into a conduit 17 toward the final reactor stage, represented by bubbling reactor 3. A portion of the reaction product flowing through conduit 17, however, is diverted into a branch conduit 18 and fed into the first reactor 1 to assist in accelerating the chlorination process of the paraffin hydrocarbons in that reactor stage.

Concurrently, the residual reaction gas generated in and emanating from the second reactor stage, containing approximately 10% to 15% chlorine by volume, is conducted through a conduit 19 into the first reactor stage so as to further assist in the acceleration of the chlorination process in that reactor stage.

The partially chlorinated chloroparaffin-containing reaction product of the first reactor stage is conveyed, by means of an exhaust pump 20, through an outlet conduit 21 into a conduit 22 which leads into the second reactor stage. At the same time, the residual reaction gas of the first reactor stage, containing a maximum of approximately 0.5% chlorine by volume, is conveyed through a conduit 23 into a second adiabatic hydrogen chloride absorber 24, wherein the residual reaction gas is converted into a harmless industrial waste gas vented through an outlet 25, and into an aqueous solution containing hydrochloric acid. Furthermore, hydrochloric acid produced in absorber 13 is withdrawn through a conduit 26 which connects into a conduit 27 a hydrochloric absorber 24 so as to provide for the constant removal of the hydrochloric acid produced in both hydrogen chloride absorbers 13 and 24 by means of a suction pump 28.

Although any number of chlorination reactor stages may be utilized in carrying out the inventive concept, the process of continually manufacturing stable chloroparaffins has been advantageously accomplished in three sequential or successive stages, preferably at optimum reaction temperatures of 90° to 100° C., wherein the residual reaction gas emanating from the third or final reactor stage contains about 40% chlorine by volume, the residual reaction gas issuing from the second stage contains about 10% to 15% chlorine by volume, and the resiudal reaction gas emanating from the first stage includes ideally a maximum of approximately 0.2% chlorine by volume. The finished reaction product comprising completely chlorinated chloroparaffin is then purged, in a manner well known in the technology, with an inert gas for removal of any gases, and subsequently treated with stabilizing agents., In order to provide for the indirect cooling of the heat of reaction generated incidentally to the conversion of the gaseous chlorine and paraffin hydrocarbon mixtures into chloroparaffin in each of the reactor stages, the heat of reaction being approximately 360 kcal. per kg. of converted chlorine, each reactor stage or bubbling reactor 1, 2 and 3 may be fitted with a head-and-sump condensator of usual design.

An illustration of the practical application of the process of continuously producing stable chloroparaffins according to the present invention, is provided in the following example.

EXAMPLE 1

Three chlorination reactor stages of known design were utilized, the stages consisting of 300 mm. diameter bubbling reactor columns having a height of 4 m. The first reactor stage, corresponding to illustrated bubble reactor 1, was charged with 400 kg. per hour of a highly-refined, petroleum-based paraffin hydrocarbon wax mixture. The paraffin hydrocarbon wax used consisted of a wax having a melting point of 43° C. and an average molecular weight of 310. Concurrently, 560 kg. per hour of chlorine was introduced into the final or third reactor stage, designated by bubbling reactor 3, in counterflow relationship to the paraffin hydrocarbon wax. The reaction temperature in each of the three successive reactor stages was maintained at 90° to 100° C., and each stage subjected to an internal pressure of 0.3 to 0.5 atmospheres. A hydrogen chloride absorber of the adiabatic type, represented by absorber 13, was charged with 2 cubic meters per hour of cold water, which is required for absorption of approximately 80% of the hydrochloric acid produced through the introduction of the residual reaction gas emanating from the third or final reactor stage, i.e. the bubbling reactor 3.

The product obtained from the final or third reactor stage consisted of essentially 660 kg. of water-clear chloroparaffin, containing 40% chlorine by weight, during each hour of operation. The portion of the chloroparaffin withdrawn from the reactor system was subsequently treated to remove gases contained therein and stabilized through the addition of suitable stabilizing agents. The residual reaction gas obtained from the first reactor stage, i.e. bubbling reactor 1, contained 0.3% chlorine by volume, thereby clearly indicating that the process of chlorination of the paraffin hydrocarbon mixtures by the chlorine to produce chloroparaffin was highly efficient.

When utilizing the installation of Example 1 in a continuous production process for chloroparaffin in accordance with the prior art, in effect, without the intermediate absorption of the generated hydrogen chloride reaction gases and recycling of the gases and portions of the product, a considerable drop in the efficiency was experienced as illustrated in the following example.

EXAMPLE 2

In utilizing the installation as described with reference to Example 1, the bubble reactor columns were connected in successive order without connection for the intermediate absorption of the generated hydrogen chloride residual reaction gas. The result was that effecting the process in that manner only allowed for the introduction of 250 kg. per hour of paraffin wax into the first reactor stage, and 350 kg. per hour of chlorine into the final or third reactor stage. By utilizing the process according to this example, hydrogen chloride-containing residual reaction gas was generated in the first reactor stage which included an excess of 2% chlorine by volume, as compared with only 0.3% chlorine by volume obtained in Example 1. This clearly indicated a drop in the efficiency of the process in chlorinating the paraffin hydrocarbon mixtures.

When applying the intermediate absorption of the hydrochloric acid and recycling the residual gases from the absorber the production volume with respect to time and space required in Example 1 provided a chloroparaffin product yield approximately 50% higher than that obtained with the process according to Example 2.

Accordingly, the process of the continuous production of chloroparaffin pursuant to the invention clearly provides a much more efficient sequence of operation than that heretofore obtainable in the technology.

While there has been shown what is considered to be the preferred embodiment of the invention, it will be obvious that modifications may be made which come within the scope of the disclosure of the specification.

What is claimed is:

1. A system for the continuous production of stable chloroparaffins having a chlorine content within the range of about 35% to 65% by weight, by continuously reacting chlorine and highly-refined mixtures of petroleum-based paraffin hydrocarbons in a plurality of sequential converting reactor stages; comprising:
    (a) first reactor chamber means forming a first one of said reactor stages; supply conduit means for conveying predetermined quantities of said paraffin hydrocarbon mixtures into an upper end of said chamber means;
(b) further reactor chamber means forming a final one of said reactor stages; supply conduit means for introducing a continuous flow of chlorine...

4. A system as claimed in claim 2, comprising for maintaining the converting... each of said...